(12) United States Patent
Ganesan et al.

(10) Patent No.: US 10,817,314 B1
(45) Date of Patent: Oct. 27, 2020

(54) AUGMENTED SHAREABLE VIDEO FILES FOR ROBOTIC PROCESS AUTOMATION

(71) Applicant: NTT DATA Services, LLC, Plano, TX (US)

(72) Inventors: Dhurai Ganesan, Chennai (IN); Sankar Chandrasekaran, Chennai (IN); Harsh Vinayak, Gurgaon (IN); Tanvir Khan, Allen, TX (US)

(73) Assignee: NTT DATA Services, LLC, Plano, TX (US)

( * ) Notice: Subject to any disclaimer, the term of this patent is extended or adjusted under 35 U.S.C. 154(b) by 0 days.

(21) Appl. No.: 16/590,063

(22) Filed: Oct. 1, 2019

(51) Int. Cl.
*G06F 9/451* (2018.01)
*G06F 40/14* (2020.01)

(52) U.S. Cl.
CPC .............. *G06F 9/451* (2018.02); *G06F 40/14* (2020.01)

(58) Field of Classification Search
CPC .................................. G06F 9/451; G06F 40/14
See application file for complete search history.

(56) References Cited

U.S. PATENT DOCUMENTS

| | | | |
|---|---|---|---|
| 2017/0001308 A1* | 1/2017 | Bataller | ................ G06F 3/0484 |
| 2017/0228119 A1 | 8/2017 | Hosbettu et al. | |
| 2018/0197123 A1 | 7/2018 | Parimelazhagan et al. | |
| 2019/0180746 A1 | 6/2019 | Diwan et al. | |
| 2020/0050529 A1* | 2/2020 | Balasubramanian | ........................ G06F 11/3447 |
| 2020/0206920 A1* | 7/2020 | Ma | ...................... G06F 11/3438 |

FOREIGN PATENT DOCUMENTS

EP         3112965 A1     1/2017

* cited by examiner

*Primary Examiner* — Shen Shiau
(74) *Attorney, Agent, or Firm* — Shackelford, Bowen, McKinley & Norton, LLP

(57) ABSTRACT

In one general aspect, in an embodiment, a method of performance-enhanced machine-learning model creation is performed by a computer system. The method includes receiving a command to record user interface (UI) activity in a computing environment. The method further includes, responsive to the command: receiving video frames of a live screen output of the computing environment; detecting UI events in the computing environment in relation to the video frames of the live screen output; and determining target applications for the UI events, wherein the target applications are executing in the computing environment. The method also includes generating UI metadata comprising information identifying the UI events and the target applications in relation to the video frames. In addition, the method includes sequentially encoding, in a video file, the video frames together with information sufficient to derive the UI metadata.

20 Claims, 26 Drawing Sheets

```xml
<AFTE>
  <Steps>
    <LibId>0</LibId>
    <Heading>KeyboardValues</Heading>
    <LibAliceName>KeyboardValues</LibAliceName>
    <Lib_Language_Desc>KeyboardValues</Lib_Language_Desc>
    <LibDesc>KeyboardValues</LibDesc>
    <Key/>
    <XMLContent>
      <KeyboardValues>
        <KeyboardSteps>
          <Row_Key>_16f1f16d_9b61_4cad_bee3_34c8960abe38</Row_Key>
          <Description/>
          <Delay>1000</Delay>
          <Occurance>1</Occurance>
          <VariableInput>NO</VariableInput>
          <DataType/>
          <VariableName/>
          <UserInput>{LWin}+d</UserInput>
          <GV_AU_COL/>
          <CITRIXWindow>NO</CITRIXWindow>
          <WindowTitle>---Active Window---</WindowTitle>
          <VI_WindowTitle>Fixed</VI_WindowTitle>
          <MaximizeWindow/>
          <KeystrokesDelay>100</KeystrokesDelay>
        </KeyboardSteps>
      </KeyboardValues>
    </XMLContent>
    <OrderNo>0</OrderNo>
    <LibStatus/>
    <Cond_Lib_Link/>
    <Disable_LIB/>
    <ScreenShot_Required/>
    <CoreProcessXMLContent/>
    <Transaction_Begin_End/>
    <Execution_StartFrom/>
    <Lib_RegionInfo/>
  </Steps>
```

FIG. 7

```xml
<Steps>
    <LibId>0</LibId>
    <Heading>MouseValues</Heading>
    <LibAliasName>MouseValues</LibAliasName>
    <Lib_Language_Desc>MouseValues</Lib_Language_Desc>
    <LibDesc>MouseValues</LibDesc>
    <Key/>
    <XMLContent>
        <MouseValues>
            <MouseValueSteps>
                <Row_Key>_273eb091_754c_4408_83b6_aac9421ab8e6</Row_Key>
                <WindowTitle>---Active Window---</WindowTitle>
                <CoordinationSelectedType>C</CoordinationSelectedType>
                <Coordination>X = 276, Y = 446</Coordination>
                <CoordinationX>276</CoordinationX>
                <CoordinationY>446</CoordinationY>
                <CoordinationToX>276</CoordinationToX>
                <CoordinationToY>446</CoordinationToY>
                <CopyValueTo/>
                <CopyVariableName/>
                <Title>---Active Window---</Title>
                <Delay>2613</Delay>
                <Action>Left Button</Action>
                <Event>Click</Event>
                <Col_VariableName/>
                <SV_AU_COL/>
                <Maximize_window>NO</Maximize_window>
                <OtherWindowTitle>---Active Window---</OtherWindowTitle>
                <OtherWindowVariableInput>NO</OtherWindowVariableInput>
                <CoordinationVariableX>Fixed</CoordinationVariableX>
                <CoordinationVariableY>Fixed</CoordinationVariableY>
            </MouseValueSteps>
            <MouseValueSteps>
                <Row_Key>_beed8d1f_f812_4441_9cbe_bedd4c8e10de</Row_Key>
                <WindowTitle>---Active Window---</WindowTitle>
                <CoordinationSelectedType>C</CoordinationSelectedType>
                <Coordination>X = 276, Y = 446</Coordination>
                <CoordinationX>276</CoordinationX>
                <CoordinationY>446</CoordinationY>
                <CoordinationToX>276</CoordinationToX>
                <CoordinationToY>446</CoordinationToY>
                <CopyValueTo/>
                <CopyVariableName/>
                <Title>---Active Window---</Title>
                <Delay>79</Delay>
                <Action>Left Button</Action>
                <Event>Click</Event>
                <Col_VariableName/>
                <SV_AU_COL/>
                <Maximize_window>NO</Maximize_window>
                <OtherWindowTitle>---Active Window---</OtherWindowTitle>
                <OtherWindowVariableInput>NO</OtherWindowVariableInput>
                <CoordinationVariableX>Fixed</CoordinationVariableX>
                <CoordinationVariableY>Fixed</CoordinationVariableY>
            </MouseValueSteps>
        </MouseValues>
    </XMLContent>
    <OrderNo>0</OrderNo>
    <LibStatus/>
    <Cond_Lib_Link/>
    <Disable_Lib/>
    <ScreenShot_Required/>
    <CoreProcessXMLContent/>
    <Transaction_Begin_End/>
    <Execution_StartFrom/>
    <Lib_RegionInfo/>
</Steps>
```

FIG. 8

```xml
<Steps>
  <LibId>0</LibId>
  <Heading>KeyboardValues</Heading>
  <LibAliceName>KeyboardValues</LibAliceName>
  <Lib_Language_Desc>KeyboardValues</Lib_Language_Desc>
  <LibDesc>KeyboardValues</LibDesc>
  <Key/>
  <XMLContent>
    <KeyboardValues>
      <KeyboardSteps>
        <Row_Key>_24e6a397_b780_4ede_9344_8898f7b4b394</Row_Key>
        <Description/>
        <Delay>1000</Delay>
        <Occurance>1</Occurance>
        <VariableInput>NO</VariableInput>
        <DataType/>
        <VariableName/>
        <UserInput>*****</UserInput>
        <GV_AU_COL/>
        <CITRIXWindow>NO</CITRIXWindow>
        <WindowTitle>Insurance Account Number Search</WindowTitle>
        <VI_WindowTitle>Fixed</VI_WindowTitle>
        <MaximizeWindow/>
        <KeystrokesDelay>100</KeystrokesDelay>
      </KeyboardSteps>
      <KeyboardSteps>
        <Row_Key>_6adbf9ef_edca_4adf_b757_fffb966c175a</Row_Key>
        <Description/>
        <Delay>1000</Delay>
        <Occurance>1</Occurance>
        <VariableInput>NO</VariableInput>
        <DataType/>
        <VariableName/>
        <UserInput>{Tab}</UserInput>
        <GV_AU_COL/>
        <CITRIXWindow>NO</CITRIXWindow>
        <WindowTitle>Insurance Account Number Search</WindowTitle>
        <VI_WindowTitle>Fixed</VI_WindowTitle>
        <MaximizeWindow/>
        <KeystrokesDelay>100</KeystrokesDelay>
      </KeyboardSteps>
      <KeyboardSteps>
        <Row_Key>_5d8a67cb_c755_4429_ba52_48ac08243552</Row_Key>
        <Description/>
        <Delay>1000</Delay>
        <Occurance>1</Occurance>
        <VariableInput>NO</VariableInput>
        <DataType/>
        <VariableName/>
        <UserInput>*****</UserInput>
        <GV_AU_COL/>
        <CITRIXWindow>NO</CITRIXWindow>
        <WindowTitle>Insurance Account Number Search</WindowTitle>
        <VI_WindowTitle>Fixed</VI_WindowTitle>
        <MaximizeWindow/>
        <KeystrokesDelay>100</KeystrokesDelay>
      </KeyboardSteps>
```

FIG. 9A

```xml
<KeyboardSteps>
    <Row_Key>_0714ff9d_9a10_4902_87a5_a95f7e29813f</Row_Key>
    <Description/>
    <Delay>1000</Delay>
    <Occurance>1</Occurance>
    <VariableInput>NO</VariableInput>
    <DataType/>
    <VariableName/>
    <UserInput>{Enter}</UserInput>
    <GV_AU_COL/>
    <CITRIXWindow>NO</CITRIXWindow>
    <WindowTitle>Insurance Account Number Search</WindowTitle>
    <VI_WindowTitle>Fixed</VI_WindowTitle>
    <MaximizeWindow/>
    <KeystrokesDelay>100</KeystrokesDelay>
</KeyboardSteps>
<KeyboardSteps>
    <Row_Key>_0b1b9eae_723a_4b0a_ab4e_fa01c87baf7c</Row_Key>
    <Description/>
    <Delay>1000</Delay>
    <Occurance>1</Occurance>
    <VariableInput>NO</VariableInput>
    <DataType/>
    <VariableName/>
    <UserInput>1</UserInput>
    <GV_AU_COL/>
    <CITRIXWindow>NO</CITRIXWindow>
    <WindowTitle>Insurance Account Number Search</WindowTitle>
    <VI_WindowTitle>Fixed</VI_WindowTitle>
    <MaximizeWindow/>
    <KeystrokesDelay>100</KeystrokesDelay>
</KeyboardSteps>
      </KeyboardValues>
    </XMLContent>
    <OrderNo>0</OrderNo>
    <LibStatus/>
    <Cond_Lib_Link/>
    <Disable_LIB/>
    <ScreenShot_Required/>
    <CoreProcessXMLContent/>
    <Transaction_Begin_End/>
    <Execution_StartFrom/>
    <Lib_RegionInfo/>
</Steps>
```

FIG. 9B

```xml
<Steps>
    <LibId>0</LibId>
    <Heading>Delay</Heading>
    <LibAliceName>Delay</LibAliceName>
    <Lib_Language_Desc>Delay</Lib_Language_Desc>
    <LibDesc>Delay</LibDesc>
    <Key>AVATAR_e56d0d69_2421_43bf_8cef_4c377bd98889</Key>
    <XMLContent>
      <Delay>
          <ActionType>Delay</ActionType>
          <VariFixed>Fixed</VariFixed>
          <Duration>1157</Duration>
          <DurationType>MilliSeconds</DurationType>
      </Delay>
    </XMLContent>
    <OrderNo>0</OrderNo>
    <LibStatus>Success</LibStatus>
    <Cond_Lib_Link/>
    <Disable_LIB>NO</Disable_LIB>
    <ScreenShot_Required/>
    <CoreProcessXMLContent/>
    <Transaction_Begin_End/>
    <Execution_StartFrom/>
    <Lib_RegionInfo/>
</Steps>
```

FIG. 10

```xml
<Steps>
    <LibId>0</LibId>
    <Heading>IF Else</Heading>
    <LibAliceName>IF</LibAliceName>
    <Lib_Language_Desc>IF</Lib_Language_Desc>
    <LibDesc>IF</LibDesc>
    <Key>AVATAR_cde4edb6_b7af_4162_8229_c240ae3f8783</Key>
    <XMLContent>
        <IFElseCondition>
            <HeaderContent>
                <ConditionType>IF</ConditionType>
                <ConditionSelection>WindowExists</ConditionSelection>
                <LogicalOperator>AND</LogicalOperator>
                <WindowName>Insurance Account Number Search</WindowName>
                <WN_UserInput>Insurance Account Number Search</WN_UserInput>
                <WindowVariableInput>NO</WindowVariableInput>
                <WN_Operator>Contains</WN_Operator>
                <WN_NOTC>1</WN_NOTC>
                <WN_ETWT>1000</WN_ETWT>
                <WindowClose>NO</WindowClose>
            </HeaderContent>
        </IFElseCondition>
    </XMLContent>
    <OrderNo>0</OrderNo>
    <LibStatus>Success</LibStatus>
    <Cond_Lib_Link/>
    <Disable_LIB>NO</Disable_LIB>
    <ScreenShot_Required/>
    <CoreProcessXMLContent/>
    <Transaction_Begin_End/>
    <Execution_StartFrom/>
    <Lib_RegionInfo/>
</Steps>
```

FIG. 11

```xml
<Steps>
    <LibId>0</LibId>
    <Heading>MouseValues</Heading>
    <LibAliceName>MouseValues</LibAliceName>
    <Lib_Language_Desc>MouseValues</Lib_Language_Desc>
    <LibDesc>MouseValues</LibDesc>
    <Key/>
    <XMLContent>
        <MouseValues>
            <MouseValueSteps>
                <Row_Key>_96b00b50_06b5_4d9f_9a79_b3df4ce9c709</Row_Key>
                <WindowTitle>Insurance Account Number Search</WindowTitle>
                <CoordinationSelectedType>C</CoordinationSelectedType>
                <Coordination>X = 810, Y = 438</Coordination>
                <CoordinationX> 810</CoordinationX>
                <CoordinationY> 438</CoordinationY>
                <CoordinationToX> 810</CoordinationToX>
                <CoordinationToY> 438</CoordinationToY>
                <CopyValueTo/>
                <CopyVariableName/>
                <Title>Insurance Account Number Search</Title>
                <Delay>1157</Delay>
                <Action>Left Button</Action>
                <Event>Click</Event>
                <Col_VariableName/>
                <GV_AU_COL/>
                <Maximize_window>NO</Maximize_window>
                <OtherWindowTitle>Insurance Account Number Search</OtherWindowTitle>
                <OtherWindowVariableInput>NO</OtherWindowVariableInput>
                <CoordinationVariableX>Fixed</CoordinationVariableX>
                <CoordinationVariableY>Fixed</CoordinationVariableY>
            </MouseValueSteps>
            <MouseValueSteps>
                <Row_Key>_b7820958_c7ae_413d_8cae_4ffc004536d8</Row_Key>
                <WindowTitle>Insurance Account Number Search</WindowTitle>
                <CoordinationSelectedType>C</CoordinationSelectedType>
                <Coordination>X = 381, Y = 512</Coordination>
                <CoordinationX> 381</CoordinationX>
                <CoordinationY> 512</CoordinationY>
                <CoordinationToX> 381</CoordinationToX>
                <CoordinationToY> 512</CoordinationToY>
                <CopyValueTo/>
                <CopyVariableName/>
                <Title>Insurance Account Number Search</Title>
                <Delay>2016</Delay>
                <Action>Left Button</Action>
                <Event>Click</Event>
                <Col_VariableName/>
                <GV_AU_COL/>
                <Maximize_window>NO</Maximize_window>
                <OtherWindowTitle>Insurance Account Number Search</OtherWindowTitle>
                <OtherWindowVariableInput>NO</OtherWindowVariableInput>
                <CoordinationVariableX>Fixed</CoordinationVariableX>
                <CoordinationVariableY>Fixed</CoordinationVariableY>
            </MouseValueSteps>
```

FIG. 12A

```xml
▼<MouseValueSteps>
    <Row_Key>_d5877cd8_9505_407b_848e_580e70f90fc1</Row_Key>
    <WindowTitle>Insurance Details</WindowTitle>
    <CoordinationSelectedType>C</CoordinationSelectedType>
    <Coordination>X = 1110, Y = 905</Coordination>
    <CoordinationX> 1110</CoordinationX>
    <CoordinationY> 905</CoordinationY>
    <CoordinationToX> 1110</CoordinationToX>
    <CoordinationToY> 905</CoordinationToY>
    <CopyValueTo/>
    <CopyVariableName/>
    <Title>Insurance Details</Title>
    <Delay>3407</Delay>
    <Action>Left Button</Action>
    <Event>Click</Event>
    <Col_VariableName/>
    <GV_AU_COL/>
    <Maximize_window>NO</Maximize_window>
    <OtherWindowTitle>Insurance Details</OtherWindowTitle>
    <OtherWindowVariableInput>NO</OtherWindowVariableInput>
    <CoordinationVariableX>Fixed</CoordinationVariableX>
    <CoordinationVariableY>Fixed</CoordinationVariableY>
  </MouseValueSteps>
 </MouseValues>
</XMLContent>
<OrderNo>0</OrderNo>
<LibStatus/>
<Cond_Lib_Link/>
<Disable_LIB/>
<ScreenShot_Required/>
<CoreProcessXMLContent/>
<Transaction_Begin_End/>
<Execution_StartFrom/>
<Lib_RegionInfo/>
</Steps>
```

FIG. 12B

```
▼<Steps>
   <LibId>0</LibId>
   <Heading>IF Else</Heading>
   <LibAliceName>ELSE</LibAliceName>
   <Lib_Language_Desc>ELSE</Lib_Language_Desc>
   <LibDesc>ELSE</LibDesc>
   <Key>AVATAR_cc66d6d9_cfa7_47aa_a7db_e85df00513f8</Key>
 ▼<XMLContent>
   ▼<IFElseCondition>
     ▼<HeaderContent>
         <ConditionType>ELSE</ConditionType>
         <ConditionSelection>WindowExists</ConditionSelection>
         <LogicalOperator>AND</LogicalOperator>
         <WindowName/>
         <WN_UserInput/>
         <WindowVariableInput>NO</WindowVariableInput>
         <WN_Operator>Contains</WN_Operator>
         <WN_NOTC>1</WN_NOTC>
         <WN_ETWT>1000</WN_ETWT>
         <WindowClose>NO</WindowClose>
       </HeaderContent>
     </IFElseCondition>
   </XMLContent>
   <OrderNo>0</OrderNo>
   <LibStatus>Success</LibStatus>
   <Cond_Lib_Link/>
   <Disable_LIB>NO</Disable_LIB>
   <ScreenShot_Required/>
   <CoreProcessXMLContent/>
   <Transaction_Begin_End/>
   <Execution_StartFrom/>
   <Lib_RegionInfo/>
 </Steps>
```

FIG. 13

```
▼<Steps>
    <LibId>0</LibId>
    <Heading>GOTOSTEP</Heading>
    <LibAliceName>GOTOSTEP</LibAliceName>
    <Lib_Language_Desc>GOTOSTEP</Lib_Language_Desc>
    <LibDesc>GOTOSTEP</LibDesc>
    <Key>AVATAR_35a90b0b_0b08_4187_b75e_85db69c49589</Key>
  ▼<XMLContent>
    ▼<HeaderContent>
        <GoToStep>AVATAR_e56d0d69_2421_43bf_8cef_4c377bd98889</GoToStep>
      </HeaderContent>
    </XMLContent>
    <OrderNo>0</OrderNo>
    <LibStatus>Success</LibStatus>
    <Cond_Lib_Link/>
    <Disable_LIB>NO</Disable_LIB>
    <ScreenShot_Required/>
    <CoreProcessXMLContent/>
    <Transaction_Begin_End/>
    <Execution_StartFrom/>
    <Lib_RegionInfo/>
  </Steps>
```

FIG. 14

```xml
<Steps>
   <LibId>0</LibId>
   <Heading>IF Else</Heading>
   <LibAliceName>END IF</LibAliceName>
   <Lib_Language_Desc>END IF</Lib_Language_Desc>
   <LibDesc>END IF</LibDesc>
   <Key>AVATAR_2d09f504_9455_483c_acf4_36bfe1c676d4</Key>
   <XMLContent>
      <IFElseCondition>
         <HeaderContent>
            <ConditionType>END IF</ConditionType>
            <ConditionSelection>WindowExists</ConditionSelection>
            <LogicalOperator>AND</LogicalOperator>
            <WindowName/>
            <WN_UserInput/>
            <WindowVariableInput>NO</WindowVariableInput>
            <WN_Operator>Contains</WN_Operator>
            <WN_NOTC>1</WN_NOTC>
            <WN_ETWT>1000</WN_ETWT>
            <WindowClose>NO</WindowClose>
         </HeaderContent>
      </IFElseCondition>
   </XMLContent>
   <OrderNo>0</OrderNo>
   <LibStatus>Success</LibStatus>
   <Cond_Lib_Link/>
   <Disable_LIB>NO</Disable_LIB>
   <ScreenShot_Required/>
   <CoreProcessXMLContent/>
   <Transaction_Begin_End/>
   <Execution_StartFrom/>
   <Lib_RegionInfo/>
</Steps>
```

FIG. 15

```xml
<Steps>
    <LibId>0</LibId>
    <Heading>KeyboardValues</Heading>
    <LibAliceName>KeyboardValues</LibAliceName>
    <Lib_Language_Desc>KeyboardValues</Lib_Language_Desc>
    <LibDesc>KeyboardValues</LibDesc>
    <Key/>
  <XMLContent>
    <KeyboardValues>
      <KeyboardSteps>
        <Row_Key>_5233d3d4_2d24_4b21_b527_4ff06c214a63</Row_Key>
        <Description/>
        <Delay>1000</Delay>
        <Occurance>1</Occurance>
        <VariableInput>NO</VariableInput>
        <DataType/>
        <VariableName/>
        <UserInput>d001</UserInput>
        <GV_AU_COL/>
        <CITRIXWindow>NO</CITRIXWindow>
        <WindowTitle>Denial</WindowTitle>
        <VI_WindowTitle>fixed</VI_WindowTitle>
        <MaximizeWindow/>
        <KeystrokesDelay>100</KeystrokesDelay>
      </KeyboardSteps>
    </KeyboardValues>
  </XMLContent>
    <OrderNo>0</OrderNo>
    <LibStatus/>
    <Cond_Lib_Link/>
    <Disable_LIB/>
    <ScreenShot_Required/>
    <CoreProcessXMLContent/>
    <Transaction_Begin_End/>
    <Execution_StartFrom/>
    <Lib_RegionInfo/>
</Steps>
```

FIG. 16

```xml
<Steps>
    <LibId>0</LibId>
    <Heading>Delay</Heading>
    <LibAliceName>Delay</LibAliceName>
    <Lib_Language_Desc>Delay</Lib_Language_Desc>
    <LibDesc>Delay</LibDesc>
    <Key>AVATAR_c9ad40fe_9a47_47e2_a484_27a44d85e959</Key>
    <XMLContent>
        <Delay>
            <ActionType>Delay</ActionType>
            <VariFixed>Fixed</VariFixed>
            <Duration>2094</Duration>
            <DurationType>MilliSeconds</DurationType>
        </Delay>
    </XMLContent>
    <OrderNo>0</OrderNo>
    <LibStatus>Success</LibStatus>
    <Cond_Lib_Link/>
    <Disable_LIB>NO</Disable_LIB>
    <ScreenShot_Required/>
    <CoreProcessXMLContent/>
    <Transaction_Begin_End/>
    <Execution_StartFrom/>
    <Lib_RegionInfo/>
</Steps>
```

FIG. 17

```
▼<Steps>
    <LibId>0</LibId>
    <Heading>IF Else</Heading>
    <LibAliceName>IF</LibAliceName>
    <Lib_Language_Desc>IF</Lib_Language_Desc>
    <LibDesc>IF</LibDesc>
    <Key>AVATAR_337ebb7b_f440_4008_be67_c0d9d7838471</Key>
  ▼<XMLContent>
    ▼<IFElseCondition>
      ▼<HeaderContent>
          <ConditionType>IF</ConditionType>
          <ConditionSelection>WindowExists</ConditionSelection>
          <LogicalOperator>AND</LogicalOperator>
          <WindowName>Denial</WindowName>
          <WN_UserInput>Denial</WN_UserInput>
          <WindowVariableInput>NO</WindowVariableInput>
          <WN_Operator>Contains</WN_Operator>
          <WN_NOTC>1</WN_NOTC>
          <WN_ETWT>1000</WN_ETWT>
          <WindowClose>NO</WindowClose>
        </HeaderContent>
      </IFElseCondition>
    </XMLContent>
    <OrderNo>0</OrderNo>
    <LibStatus>Success</LibStatus>
    <Cond_Lib_Link/>
    <Disable_LIB>NO</Disable_LIB>
    <ScreenShot_Required/>
    <CoreProcessXMLContent/>
    <Transaction_Begin_End/>
    <Execution_StartFrom/>
    <Lib_RegionInfo/>
  </Steps>
```

FIG. 18

```xml
<Steps>
    <LibId>0</LibId>
    <Heading>MouseValues</Heading>
    <LibAliceName>MouseValues</LibAliceName>
    <Lib_Language_Desc>MouseValues</Lib_Language_Desc>
    <LibDesc>MouseValues</LibDesc>
    <Key/>
  <XMLContent>
    <MouseValues>
      <MouseValueSteps>
        <Row_Key>_1b8b68ad_881c_4506_81cd_e6a619b8c9a8</Row_Key>
        <WindowTitle>Denial</WindowTitle>
        <CoordinationSelectedType>C</CoordinationSelectedType>
        <Coordination>X = 813, Y = 566</Coordination>
        <CoordinationX> 813</CoordinationX>
        <CoordinationY> 566</CoordinationY>
        <CoordinationToX> 813</CoordinationToX>
        <CoordinationToY> 566</CoordinationToY>
        <CopyValueTo/>
        <CopyVariableName/>
        <Title>Denial</Title>
        <Delay>2094</Delay>
        <Action>Left Button</Action>
        <Event>Click</Event>
        <Col_VariableName/>
        <GV_AU_COL/>
        <Maximize_window>NO</Maximize_window>
        <OtherWindowTitle>Denial</OtherWindowTitle>
        <OtherWindowVariableInput>NO</OtherWindowVariableInput>
        <CoordinationVariableX>Fixed</CoordinationVariableX>
        <CoordinationVariableY>Fixed</CoordinationVariableY>
      </MouseValueSteps>
```

FIG. 19A

```xml
<MouseValueSteps>
    <Row_Key>_6f91c067_ff77_47a2_81e4_68832cb800c4</Row_Key>
    <WindowTitle>Denial</WindowTitle>
    <CoordinationSelectedType>C</CoordinationSelectedType>
    <Coordination>X = 868, Y = 576</Coordination>
    <CoordinationX> 868</CoordinationX>
    <CoordinationY> 576</CoordinationY>
    <CoordinationToX> 868</CoordinationToX>
    <CoordinationToY> 576</CoordinationToY>
    <CopyValueTo/>
    <CopyVariableName/>
    <Title>Denial</Title>
    <Delay>1563</Delay>
    <Action>Left Button</Action>
    <Event>Click</Event>
    <Col_VariableName/>
    <GV_AU_COL/>
    <Maximize_window>NO</Maximize_window>
    <OtherWindowTitle>Denial</OtherWindowTitle>
    <OtherWindowVariableInput>NO</OtherWindowVariableInput>
    <CoordinationVariableX>Fixed</CoordinationVariableX>
    <CoordinationVariableY>Fixed</CoordinationVariableY>
  </MouseValueSteps>
 </MouseValues>
</XMLContent>
<OrderNo>0</OrderNo>
<LibStatus/>
<Cond_Lib_Link/>
<Disable_LIB/>
<ScreenShot_Required/>
<CoreProcessXMLContent/>
<Transaction_Begin_End/>
<Execution_StartFrom/>
<Lib_RegionInfo/>
</Steps>
```

FIG. 19B

```xml
<Steps>
   <LibId>0</LibId>
   <Heading>IF Else</Heading>
   <LibAliceName>ELSE</LibAliceName>
   <Lib_Language_Desc>ELSE</Lib_Language_Desc>
   <LibDesc>ELSE</LibDesc>
   <Key>AVATAR_62cca2fd_a56e_407a_892c_3236d959e798</Key>
   <XMLContent>
      <IFElseCondition>
         <HeaderContent>
            <ConditionType>ELSE</ConditionType>
            <ConditionSelection>WindowExists</ConditionSelection>
            <LogicalOperator>AND</LogicalOperator>
            <WindowName/>
            <WN_UserInput/>
            <WindowVariableInput>NO</WindowVariableInput>
            <WN_Operator>Contains</WN_Operator>
            <WN_NOTC>1</WN_NOTC>
            <WN_ETWT>1000</WN_ETWT>
            <WindowClose>NO</WindowClose>
         </HeaderContent>
      </IFElseCondition>
   </XMLContent>
   <OrderNo>0</OrderNo>
   <LibStatus>Success</LibStatus>
   <Cond_Lib_Link/>
   <Disable_LIB>NO</Disable_LIB>
   <ScreenShot_Required/>
   <CoreProcessXMLContent/>
   <Transaction_Begin_End/>
   <Execution_StartFrom/>
   <Lib_RegionInfo/>
</Steps>
```

FIG. 20

```
▼<Steps>
    <LibId>0</LibId>
    <Heading>GOTOSTEP</Heading>
    <LibAliceName>GOTOSTEP</LibAliceName>
    <Lib_Language_Desc>GOTOSTEP</Lib_Language_Desc>
    <LibDesc>GOTOSTEP</LibDesc>
    <Key>AVATAR_e358ba2b_d31b_4c81_82ac_06851edc7e9e</Key>
  ▼<XMLContent>
    ▼<HeaderContent>
        <GoToStep>AVATAR_c9ad40fe_9a47_47e2_a484_27a44d85e959</GoToStep>
      </HeaderContent>
    </XMLContent>
    <OrderNo>0</OrderNo>
    <LibStatus>Success</LibStatus>
    <Cond_Lib_Link/>
    <Disable_LIB>NO</Disable_LIB>
    <ScreenShot_Required/>
    <CoreProcessXMLContent/>
    <Transaction_Begin_End/>
    <Execution_StartFrom/>
    <Lib_RegionInfo/>
</Steps>
```

FIG. 21

```xml
<Steps>
   <LibId>0</LibId>
   <Heading>IF Else</Heading>
   <LibAliceName>END IF</LibAliceName>
   <Lib_Language_Desc>END IF</Lib_Language_Desc>
   <LibDesc>END IF</LibDesc>
   <Key>AVATAR_5bc66207_c082_4fc9_8d04_23fed607070c</Key>
   <XMLContent>
      <IFElseCondition>
         <HeaderContent>
            <ConditionType>END IF</ConditionType>
            <ConditionSelection>WindowExists</ConditionSelection>
            <LogicalOperator>AND</LogicalOperator>
            <WindowName/>
            <WN_UserInput/>
            <WindowVariableInput>NO</WindowVariableInput>
            <WN_Operator>Contains</WN_Operator>
            <WN_NOTC>1</WN_NOTC>
            <WN_ETwT>1000</WN_ETwT>
            <WindowClose>NO</WindowClose>
         </HeaderContent>
      </IFElseCondition>
   </XMLContent>
   <OrderNo>0</OrderNo>
   <LibStatus>Success</LibStatus>
   <Cond_Lib_Link/>
   <Disable_LIB>NO</Disable_LIB>
   <ScreenShot_Required/>
   <CoreProcessXMLContent/>
   <Transaction_Begin_End/>
   <Execution_StartFrom/>
   <Lib_RegionInfo/>
</Steps>
```

FIG. 22

```
<ScreenShot/>
<AFTEVersion>2.5.0.0</AFTEVersion>
<Fileid/>
<NewAfteInfoHead/>
▼<NewAfteInfo>
    <Projecttype/>
    <Filename/>
    <Location/>
    <Prefix/>
    <ProcessId/>
    <Feasibility/>
    <BotId/>
    <RawFileName/>
  ▼<WorkFlow>
       <WorkFlowStart/>
       <WorkFlowEnd/>
       <WorkFlowVariable/>
       <StopFunction/>
    </WorkFlow>
    <ExeVersion/>
 </NewAfteInfo>
▼<ShapeGeometry>
    Login,Insurance Account Number Search,Insurance Details,Denial
 </ShapeGeometry>
 <GValueTable/>
</AFTE>
```

AUGMENTED SHAREABLE VIDEO FILES FOR ROBOTIC PROCESS AUTOMATION

BACKGROUND

Technical Field

The present disclosure relates generally to the deployment and utilization of bots for automated tasks and more particularly, but not by way of limitation, to augmented shareable video files for robotic process automation.

History Of Related Art

Task automation, while often desirable, is not always feasible. Robotic process automation (RPA) platforms have a tendency to provide a framework for automating tasks without providing a streamlined way to automatically create automated processes. Typically, extensive user intervention is necessary to automate tasks, which limits RPA's scope and volume of use.

SUMMARY OF THE INVENTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, in an embodiment, a method of performance-enhanced machine-learning model creation is performed by a computer system. The method includes receiving a command to record user interface (UI) activity in a computing environment. The method further includes, responsive to the command: receiving video frames of a live screen output of the computing environment; detecting UI events in the computing environment in relation to the video frames of the live screen output; and determining target applications for the UI events, wherein the target applications are executing in the computing environment. The method also includes generating UI metadata comprising information identifying the UI events and the target applications in relation to the video frames. In addition, the method includes sequentially encoding, in a video file, the video frames together with information sufficient to derive the UI metadata.

In another general aspect, in an embodiment, a system includes a processor and memory, where the processor and memory in combination are operable to implement a method. The method includes receiving a command to record user interface (UI) activity in a computing environment. The method further includes, responsive to the command: receiving video frames of a live screen output of the computing environment; detecting UI events in the computing environment in relation to the video frames of the live screen output; and determining target applications for the UI events, wherein the target applications are executing in the computing environment. The method also includes generating UI metadata comprising information identifying the UI events and the target applications in relation to the video frames. In addition, the method includes sequentially encoding, in a video file, the video frames together with information sufficient to derive the UI metadata.

In another general aspect, in an embodiment, a computer-program product includes a non-transitory computer-usable medium having computer-readable program code embodied therein, the computer-readable program code adapted to be executed to implement a method. The method includes receiving a command to record user interface (UI) activity in a computing environment. The method further includes, responsive to the command: receiving video frames of a live screen output of the computing environment; detecting UI events in the computing environment in relation to the video frames of the live screen output; and determining target applications for the UI events, wherein the target applications are executing in the computing environment. The method also includes generating UI metadata comprising information identifying the UI events and the target applications in relation to the video frames. In addition, the method includes sequentially encoding, in a video file, the video frames together with information sufficient to derive the UI metadata.

BRIEF DESCRIPTION OF THE DRAWINGS

A more complete understanding of the method and apparatus of the present disclosure may be obtained by reference to the following Detailed Description when taken in conjunction with the accompanying Drawings wherein:

FIGS. 7-8, 9A-B, 10-11, 12A-B, 13-18, 19A-B, and 20-23 illustrate examples of structured metadata.

DETAILED DESCRIPTION

Figure 1:
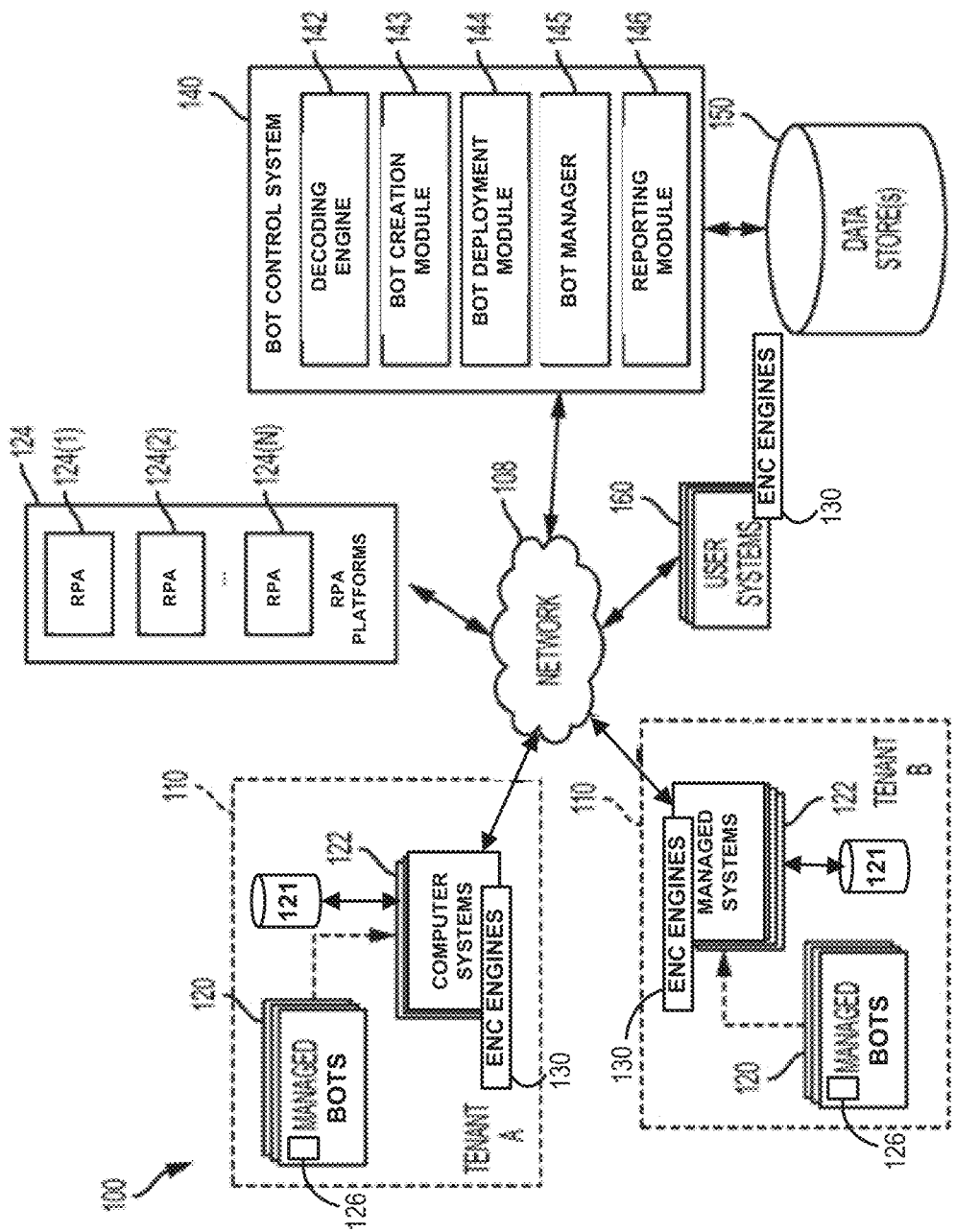
FIG. 1 illustrates an example of a system for implementing a bot control system.

Robotic process automation (RPA) is the use of software, typically in combination with artificial intelligence (AI) and machine learning capabilities, to handle high-volume sequences of repeatable tasks that previously required humans to perform. These tasks can include, but are not limited to, queries, calculations, maintenance of records and transactions, web automations, remote operations, database functions, terminal connections, desktop operations, text operations, mouse simulations, keyboard simulations, folder operations, file handlers, clipboard handlers, combinations of the foregoing and/or the like. RPA technology can mimic a human worker, for example, by logging into applications, entering data, calculating and completing tasks, and logging out.

RPA technology is not always part of an organization's information technology (IT) infrastructure, but can instead, sit on top of it, enabling an organization to implement RPA technology quickly and efficiently, without changing the existing infrastructure and systems. In various embodiments, a computing environment can include, for example, many hundreds or thousands of software agents, often referred to herein as "bots," that automatically perform robotic processes. In various cases, the sequence of computer-implemented tasks performed by each bot can be the same or different, or a combination thereof.

Although bots can provide greater efficiency via increased automation, bots introduce numerous technical problems, many of which relate to their creation. For example, even if certain tasks are capable of automation as robotic processes in a technical sense, it often becomes prohibitively resource-intensive to create bots that perform every such automation. Bot creation does not scale well in most cases due to the extensive amount of user intervention that is usually required to create and tune bots. Furthermore, even if it were feasible to partially automate some aspects of bot creation, the information and instructions used for bot creation are usually hardwired into a technical environment of a RPA platform. As a general matter, it is not technically feasible to manifest the information and instructions outside the RPA platform, for example, for sharing and distribution. Further, the information and instructions are generally narrow in purpose and lack utility outside the RPA platform, thus making sharing and distribution undesirable.

The present disclosure describes examples of creating an augmented video file that is shareable and that is useable to a create a bot which executes a robotic process. In certain embodiments, user-interface (UI) activity, representative of a user-executed process in the computing environment, is monitored and recorded in real-time. In general, the UI activity can include any action taken by a user in a UI provided by the computing environment. In certain embodiments, a software agent records the UI activity via receipt of a live screen output of the computing environment and via detection of UI events in the computing environment. The software agent can generate structured UI metadata related to the UI activity, and can sequentially encode, in a video file, video frames of the live screen output together with a representation of the structured UI metadata.

Advantageously, in certain embodiments, an augmented video file, such as the video file created by the software agent discussed above, can serve multiple technical purposes. The video file can be shareable or distributable to depict the user-executed process. In addition, or a alternatively, the video file is useable for bot creation. A computer system can immediately, or at a later time, receive the video file, decode the representation of the structured metadata, and generate the structured UI metadata. Further, the computer system can use the video frames and the structured UI metadata to automatically create a bot that executes the user-executed process as a robotic process on an RPA platform.

For purposes of this application, the term "UI" can include, without limitation, any type of human-machine interface. Example UIs include text-based interfaces such as command-line interfaces, conversational interfaces, crossing-based interfaces, direct manipulation interfaces, gesture interfaces, graphical user interfaces (GUIs), hardware interfaces, holographic user interfaces, intelligent user interfaces, motion tracking interfaces, natural-language interfaces, object-oriented user interfaces, reflexive user interfaces, touchscreen interfaces, touch user interfaces, voice user interfaces, and web-based user interfaces. Many of the aforementioned UIs accept input via input devices such as a keyboard, mouse, microphone, combinations of the foregoing, and/or the like. Inputs from any of these devices, in possible combination with specific UI objects or components, can be considered examples of UI events. For illustrative purposes, various examples will be described herein relative to GUIs and UI events that are detected or received in relation to GUIs. It should be appreciated, however, that the principles described herein are applicable to any type of UI, inclusive of the example UIs mentioned previously.

FIG. 1 illustrates an example of a system 100 for implementing a bot control system 140. The system 100 includes the bot control system 140, tenant systems 110. RPA platforms 124, user systems 160 and one or more data stores 150, each of which is operable to communicate over a network 108. The network 108 may be, or include, one or more of a private network, a public network, a local or wide area network, a portion of the Internet, combinations of the same, and/or the like.

In certain embodiments, the bot control system 140 can centrally manage bot deployments on the RPA platforms 124 for its tenants. The RPA platforms 124 are shown to include a RPA platform 124(1), a RPA platform 124(2) and a RPA platform 124(N). It should be appreciated that three RPA platforms are shown among the RPA platforms 124 only for illustrative purposes. In various implementations, any number of RPA platforms can be included among the RPA platforms 124. In a typical embodiment, the RPA platforms 124 each provide RPA software for creating and executing bots, generally using different RPA technology, interfaces and formats.

In particular, in the system 100, the tenant systems 110 can be served by the bot control system 140. In general, the tenant systems 110 can each be considered an abstraction of actual bot deployments managed by the bot control system 140 and the systems and data sources with which those bot deployments interact. For example, one of the tenant systems 110 is shown as owned or operated by "Tenant A" while another system 110 is owned or operated by a different tenant, "Tenant B." The tenant systems 110 shown can be owned or operated by the same or different entities. For example, Tenants A and B can represent customers (e.g., entities such as companies or individuals) of an operator of the bot control system 140. Although the term "tenant" is used herein to describe the tenant systems 110 or owners/operators thereof, in addition to having its ordinary meaning, the term "tenant" can, but need not, refer to tenancy in a multitenant software architecture.

The tenant systems 110 are each shown to include one or more managed bots 120, one or more computer systems 122 and one or more data sources 121. The one or more computer systems 122 can each provide a computing environment, inclusive of applications and corresponding user interfaces and dashboards, for executing configurable tasks. The one or more data sources 121 can include data streams or datasets that can be received or processed by the computer systems 122, potentially as part of executing the configurable tasks. In various cases, the one or more data sources 121 can be updated by the computer systems 122, or other components, in real-time, on a periodic basis, e.g., according to a schedule, on-demand or a combination of the same. In various cases, the tasks for which the computer systems 122 are configured can be executed in the respective computing environments, for example, by users of the user systems 160 and/or by the managed bots 120 as robotic processes. In a typical embodiment, the managed bots 120 are each deployed on an RPA platform of the RPA platforms 124 and interact as users in the computing environments of the computer systems 122 for purposes executing some or all of the configurable tasks as robotic processes.

The managed bots 120 can each include an instruction set 126 that can be used to provide the managed bots 120 a complete set of all computer-implemented tasks or steps that are to be performed in sequence automatically by the managed bots 120. In some embodiments, the instruction set 126 is in a machine-readable code that can be recognized and executed by a central processing unit. In various embodiments, the instruction set 126 can be made up of, for example, a markup language, a low-level programming language, a high-level programming language, a scripting language, a machine language, an assembly language or any combination thereof.

As illustrated, the computer systems 122 and/or the user systems 160 can include RPA video-encoding engines 130. The RPA video-encoding engines 130 are software agents that can be used to facilitate automated creation of some or all of the managed bots 120. In certain embodiments, the RPA video-encoding engines 130 can be individually triggered to monitor and record user activity, for example, by a human user of one of the user systems 160, in the computing environments provided by the computer systems 122. The user activity can represent, for example, user-executed processes in the computing environments. The user activity can include, for example, UI activity.

More particularly, the RPA video-encoding engines 130, once triggered to monitor and record, can continuously capture and/or receive video frames of a live screen output of the computing environments, where the video frames depict the user activity representing the user-executed processes. In addition, or alternatively, the RPA video-encoding engines 130 can detect UI events in the UIs of the computing environments. In some embodiments, the RPA video-encoding engines 130 can each generate UI metadata that includes certain configurable information about the user activity such as, for example, information identifying the UI events and specific software applications that were targeted by the UI events. The UI metadata can be represented in a structured format using, for example, extensible markup language (XML). In some embodiments, the UI metadata can include, or constitute, an instruction set similar to the instruction set 126 of each of the managed bots 120. In other cases, the UI metadata can include information usable to generate such an instruction set without itself constituting an instruction set.

In certain embodiments, the RPA video-encoding engines 130 sequentially encode the received video frames, together with other related information such as information related to the detected UI events and/or the UI metadata, in video files. Advantageously, in various embodiments, these video files are shareable and distributable outside the system 100, for example, as depictions of the user-executed processes to which they correspond, while also including certain other information which can be used at a later time to reate corresponding bots, as will be described in greater detail below relative to example components of the bot control system 140. In some cases, some or all of the information encoded in the video files, such as a representation of the UI metadata, can be encrypted and rendered inaccessible to viewers of the video files. Example functionality of the RPA video-encoding engines 130 will be described in greater detail relative to FIG. 3.

As illustrated, it should be appreciated that the location of the RPA video-encoding engines 130 is configurable to suit a given implementation. In some embodiments, the RPA video-encoding engines 130 can reside on the user systems 160. In other embodiments, the RPA video-encoding engines 130 can reside in the computing environments provided by the computer systems 122 with which the user systems 160 interact. In some cases, the RPA video-encoding engines 130 can reside on both the user systems 160 and the computer systems 122. In still other cases, the functionality of the RPA video-encoding engines 130 can be distributed, for example, between the computer systems 122 and the user systems 160.

In the illustrated embodiment, the bot control system 140 can include a RPA video-decoding engine 142, a bot manager 145, a bot deployment module 144, a reporting module 146 and a bot creation module 143. Each of these components can be implemented with hardware and/or software, including (optionally) virtual machines. In an example, the bot control system 140 can be implemented as a single management server. In another example, the bot control system 140 can be implemented in a plurality of virtual or physical servers, which may or may not be geographically co-located. In some embodiments, the bot control system 140 and/or other aspects of the system 100 may be hosted on a cloud-provider system.

In certain embodiments, features of the components of the bot control system 140 can be made accessible over an interface to the user systems 160. The user systems 160 can include any type of computing device, including information handling systems such as desktops, laptops, tablets, smartphones, PDAs, to name a few. The user systems 160 can be operated by users, such as human users, associated with the tenants or by other users.

The RPA video-decoding engine 142 can receive video files that have been encoded, for example, by one or more of the RPA video-encoding engines 130, and can decode, from the video files, information that has been encoded therein. For example, the RPA video-decoding engine 142 can decode video frames and a representation of UI metadata, or information sufficient to derive such UI metadata. The RPA video-decoding engine 142 can generate, or re-generate, structured UI metadata using the decoded information.

The bot creation module 143 can be utilized to create bots such as, for example, the managed bots 120. In some embodiments, an instruction set is created via the bot creation module 143 that contains all of the instructions and/or modules for a specific type of bot. The instruction set that is created can be similar to the instruction set 126 of each of the managed bots 120. In certain embodiments, the bot creation module 143 can utilize information decoded from video files by the RPA video-decoding engine 142 to automatically create each instruction set. In some embodiments, the bot creation module 143 includes or provides a configuration interface for manual creation of an instruction set, or for revision or tuning of an automatically created instruction set. The configuration interface can be accessible, for example, by the user systems 160.

In certain embodiments, the bot deployment module 144 can be utilized to deploy a bot on the RPA platforms 124 for a tenant, such that the deployed bot becomes one of the managed bots 120. In various embodiments, the bot deployment module 144 can utilize an instruction set created by the bot creation module 143 that can then be deployed. For example, the instruction set 126 of one of the managed bots 120 could be representative of a bot created by the bot creation module 143 and then deployed via the bot deployment module 144. In certain embodiments, the bot deployment module 144 can be used to deploy a single bot and/or a plurality of bots concurrently. In many cases, the bot deployment module 144 can be utilized to deploy bots on a variety of the RPA platforms 124. In some embodiments, the bot deployment module 144 can publish a configuration interface to the user systems 160, for example, for administrators, super users or other users (e.g., of a particular tenant) to select or specify such commands. In other embodiments, the bot deployment module 144 executes an automatic process to deploys bots without manual interaction. In various embodiments, the bot deployment module 144 can store command sets for some or all of the RPA platforms 124.

The bot manager 145 can serve to manage bots such as, for example, the managed bots 120, for tenants. In certain embodiments, the bot manager 145 can issue commands to control operation of bots. The bot manager 145 can be utilized to re-configure, optimize and/or customize any of the managed bots 120. For example, various commands can start or stop bots, perform configuration management, combinations of the same and/or the like. In some cases, the bot manager 145 can publish a configuration interface to the user systems 160, for example, for administrators, super users or other users (e.g., of a particular tenant) to select or specify such commands.

In some embodiments, the bot manager 145, or another component, can serve as a point of contact for initiation of bot creation and deployment using a video file that has been encoded in the fashion described relative to the RPA video-encoding engines 130. In these embodiments, the bot manager 145 can control and cause execution, for example, of the RPA video-decoding engine 142, the bot creation module 143, and/or the bot deployment module 144. Example operation of various aspects and interactions of the RPA video-decoding engine 142, the bot creation module 143, the bot deployment module 144, and the bot manager 145 will be described in relation to FIG. 4.

The reporting module 146 can generate regular or on-demand reports related to the managed bots 120. In various cases, these reports can provide a snapshot of some or all of the managed bots 120. The reporting module 146 can publish reports or other generated information, for example, to a web, and/or the like. The reporting module 146 can generate and execute a page, dashboard query of the one or more data stores 150. The web page, user dashboard or other user interface(s) output, for example, by the reporting module 146, can be accessed by users of the user systems 160.

In general, the one or more data stores 150 can include any information collected, stored or used by the bot control system 140. For example, in various embodiments, the one or more data stores 150 can include instruction sets for bots, command sets for one or more of the RPA platforms 124, deployment settings for bots (e.g., on a tenant-specific and/or bot-specific basis), metadata for bots to be deployed (e.g., metadata decoded from video files), data collected from the managed bots 120, combinations of the same and/or the like. In certain embodiments, data stored in the one or more data stores 150 can take the form of repositories, flat files, databases, etc. In certain embodiments, the one or more data stores 150 can be utilized as an event library, in which actions performed by any of the managed bots 120 and/or the user systems 160 are stored. The event library can also contain business rule libraries, exception libraries, control libraries, keyboard libraries, database libraries and/or cognitive libraries.

Figure 2:
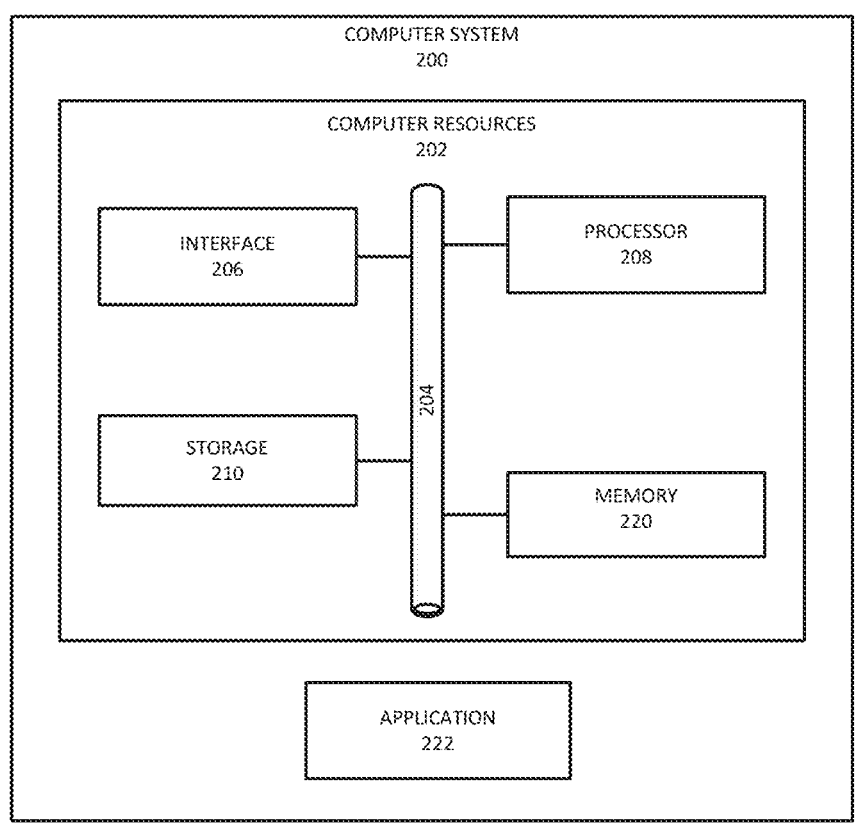
FIG. 2 illustrates an example of a computer system.

FIG. 2 illustrates an example of a computer system 200 that, in some cases, can be representative, for example, of the bot control system 140, the RPA platforms 124, the tenant systems 110, the user systems 160 and/or a module or sub-component of the foregoing. The computer system 200 includes an application 222 operable to execute on computer resources 202. The application 222 can be, for example, any of the systems or modules illustrated in FIG. 1. In particular embodiments, the computer system 200 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the computer system 200 may comprise any suitable physical form, configuration, number, type and/or layout. As an example, and not by way of limitation, the computer system 200 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 200 may include one or more computer systems; be unitary or distributed; span multiple locations; span multiple machines; or reside in a cloud, which may include one or more cloud components in one or more networks.

In the depicted embodiment, the computer system 200 includes a processor 208, memory 220, storage 210, interface 206, and bus 204. Although a particular computer system is depicted having a particular number of particular components in a particular arrangement, this disclosure contemplates any suitable computer system having any suitable number of any suitable components in any suitable arrangement.

Processor 208 may be a microprocessor, controller, or any other suitable computing device, resource, or combination of hardware, software and/or encoded logic operable to execute, either alone or in conjunction with other components, (e.g., memory 220), the application 222. Such functionality may include providing various features discussed herein. In particular embodiments, processor 208 may include hardware for executing instructions, such as those making up the application 222. As an example, and not by way of limitation, to execute instructions, processor 208 may retrieve (or fetch) instructions from an internal register, an internal cache, memory 220, or storage 210; decode and execute them; and then write one or more results to an internal register, an internal cache, memory 220, or storage 210.

In particular embodiments, processor 208 may include one or more internal caches for data, instructions, or addresses. This disclosure contemplates processor 208 including any suitable number of any suitable internal caches, where appropriate. As an example, and not by way of limitation, processor 208 may include one or more instruction caches, one or more data caches, and one or more translation lookaside buffers (TLBs). Instructions in the instruction caches may be copies of instructions in memory 220 or storage 210 and the instruction caches may speed up retrieval of those instructions by processor 208. Data in the data caches may be copies of data in memory 220 or storage 210 for instructions executing at processor 208 to operate on; the results of previous instructions executed at processor 208 for access by subsequent instructions executing at processor 208, or for writing to memory 220, or storage 210; or other suitable data. The data caches may speed up read or write operations by processor 208. The TLBs may speed up virtual-address translations for processor 208. In particular embodiments, processor 208 may include one or more internal registers for data, instructions, or addresses. Depending on the embodiment, processor 208 may include any suitable number of any suitable internal registers, where appropriate. Where appropriate, processor 208 may include one or more arithmetic logic units (ALUs); be a multi-core processor, include one or more processors 208; or any other suitable processor.

Memory 220 may be any form of volatile or non-volatile memory including, without limitation, magnetic media, optical media, random access memory (RAM), read-only memory (ROM), flash memory, removable media, or any other suitable local or remote memory component or components. In particular embodiments, memory 220 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 220 may include one or more memories 220, where appropriate. Memory 220 may store any suitable data or information utilized by the computer system 200, including software embedded in a computer readable medium, and/or encoded logic incorporated in hardware or otherwise stored (e.g., firmware). In particular embodiments, memory 220 may include main memory for storing instructions for processor 208 to execute or data for processor 208 to operate on. In particular embodiments, one or more memory management units (MMUs) may reside between processor 208 and memory 220 and facilitate accesses to memory 220 requested by processor 208.

As an example, and not by way of limitation, the computer system 200 may load instructions from storage 210 or another source (such as, for example, another computer system) to memory 220. Processor 208 may then load the instructions from memory 220 to an internal register or internal cache. To execute the instructions, processor 208 may retrieve the instructions from the internal register or internal cache and decode them. During or after execution of the instructions, processor 208 may write one or more results (which may be intermediate or final results) to the internal register or internal cache. Processor 208 may then write one or more of those results to memory 220. In particular embodiments, processor 208 may execute only instructions in one or more internal registers or internal caches or in memory 220 (as opposed to storage 210 or elsewhere) and may operate only on data in one or more internal registers or internal caches or in memory 220 (as opposed to storage 210 or elsewhere).

In particular embodiments, storage 210 may include mass storage for data or instructions. As an example, and not by way of limitation, storage 210 may include a hard disk drive (HDD), a floppy disk drive, flash memory, an optical disc, a magneto-optical disc, magnetic tape, or a Universal Serial Bus (USB) drive or a combination of two or more of these. Storage 210 may include removable or non-removable (or fixed) media, where appropriate. Storage 210 may be internal or external to the computer system 200, where appropriate. In particular embodiments, storage 210 may be non-volatile, solid-state memory. In particular embodiments, storage 210 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 210 may take any suitable physical form and may comprise any suitable number or type of storage. Storage 210 may include one or more storage control units facilitating communication between processor 208 and storage 210, where appropriate.

In particular embodiments, interface 206 may include hardware, encoded software, or both providing one or more interfaces for communication (such as, for example, packet-based communication) among any networks, any network devices, and/or any other computer systems. As an example, and not by way of limitation, communication interface 206 may include a network interface controller (NIC) or network adapter for communicating with an Ethernet or other wire-based network and/or a wireless NIC (WNIC) or wireless adapter for communicating with a wireless network.

Depending on the embodiment, interface 206 may be any type of interface suitable for any type of network for which computer system 200 is used. As an example, and not by way of limitation, computer system 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 200 may include any suitable interface 206 for any one or more of these networks, where appropriate.

In some embodiments, interface 206 may include one or more interfaces for one or more I/O devices. One or more of these I/O devices may enable communication between a person and the computer system 200. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 206 for them. Where appropriate, interface 206 may include one or more drivers enabling processor 208 to drive one or more of these I/O devices. Interface 206 may include one or more interfaces 206, where appropriate.

Bus 204 may include any combination of hardware, software embedded in a computer readable medium, and/or encoded logic incorporated in hardware or otherwise stored (e.g., firmware) to couple components of the computer system 200 to each other. As an example, and not by way of limitation, bus 204 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 204 may include any number, type, and/or configuration of buses 204, where appropriate. In particular embodiments, one or more buses 204 (which may each include an address bus and a data bus) may couple processor 208 to memory 220. Bus 204 may include one or more memory buses.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 208 (such as, for example, one or more internal registers or caches), one or more portions of memory 220, one or more portions of storage 210, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Figure 3:
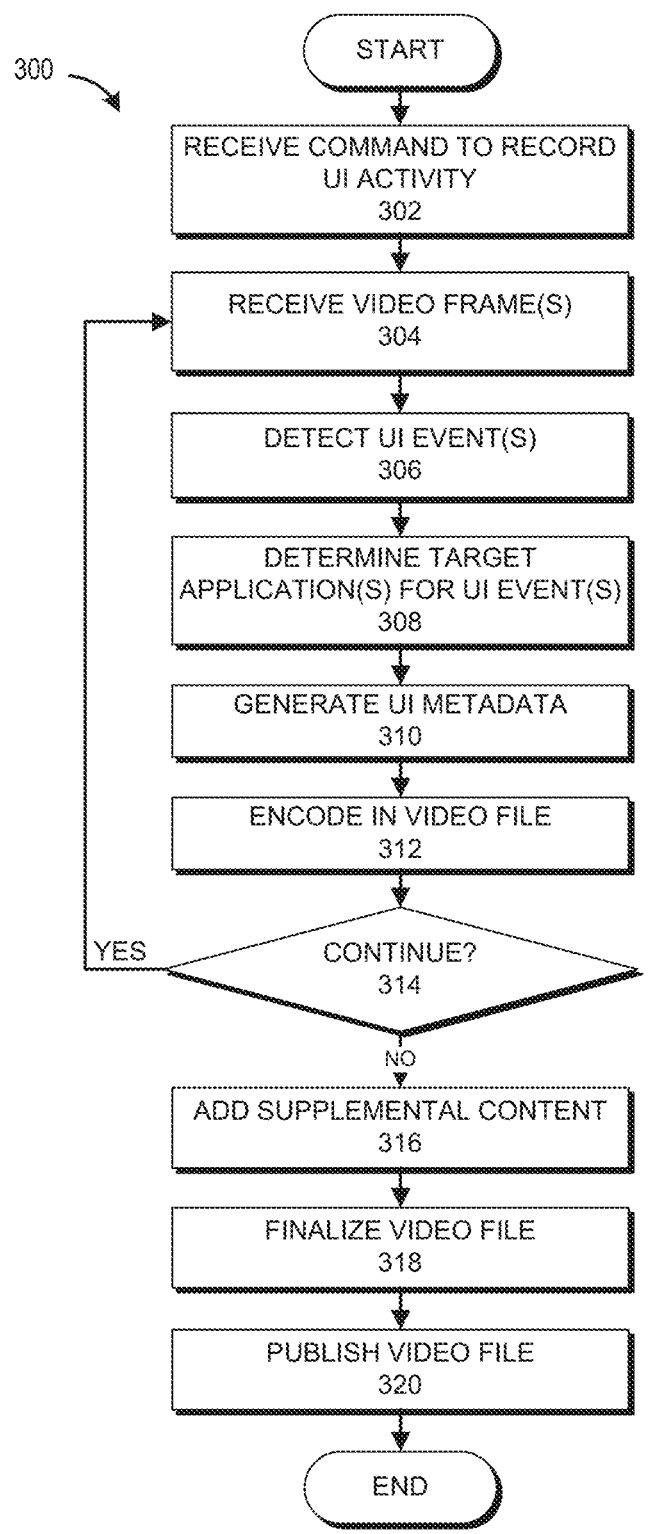
FIG. 3 illustrates an example of a process for encoding an augmented shareable video file for robotic process automation.

FIG. 3 illustrates an example of a process 300 for encoding an augmented shareable video file for RPA. In certain embodiments, the process 300 can be implemented by any system that can process data. Although any number of systems, in whole or in part, can implement the process 300, to simplify discussion, the process 300 will be described in relation to a particular RPA video-encoding engine 130 of the RPA video-encoding engines 130 of FIG. 1. It should be appreciated that a similar process can be independently executed by any of the RPA video-encoding engines in response, for example, to appropriate user commands or triggers.

At block 302, the particular RPA video-encoding engine 130 receives a command to record UI activity in the computing environment provided by a particular computer system of the computer systems 122. For illustrative purposes, the command will be described as specifying or relating to a particular user system of the user systems 160, where the particular user system 160 performs or coordinates a user-executed process via one or more UIs of the computing environment of the particular computer system 122. It should be appreciated, however, that the command can in some cases relate or correspond, for example, to bots serving as users. In various embodiments, the command can be received via an interface, such as a GUI, served by the particular RPA video-encoding engine 130. In some embodiments, the command can be a trigger received from another system or module, such as a command received by another module of the bot control system 140 (e.g., the bot manager 145).

Blocks 304-314 generally represent functionality of the particular RPA video-encoding engine 130 to record, in real-time, UI activity from the particular user system 160. At block 304, the particular RPA video-encoding engine 130 receives or captures one or more video frames of a live screen output of the computing environment. At block 306, the particular RPA video-encoding engine 130 detects one or more UI events in the computing environment in relation to the video frames of the live screen output. As described previously, the UI events can correspond to input from various input devices such as a keyboard, mouse, microphone, touchscreen, combinations of the foregoing and/or the like.

At block 308, the particular RPA video-encoding engine 130 determines target application(s) for the detected UI event(s). Generally, the target application(s) are executing in the computing environment of the particular computer system 122 and provide at least part of a UI with which the particular user system 160 interacts. The target application(s) may include, for example, an application to which the detected UI event(s) are directed, for example, as a result of being in focus or as a result of providing a UI object or component to which the detected UI event(s) relate. Examples include, but are not limited to, an application that provided a text box for receiving text (keyboard event) and an application that is clicked (mouse click event).

At block 310, the particular RPA video-encoding engine 130 generates UI metadata. In various embodiments, the UI metadata can relate to the video frame(s) from the block 304, the detected UI event(s) from the block 306, and/or the determined target application(s) from the block 308. For example, the UI metadata include information identifying the detected UI event(s) and the determined target application(s) in relation to the video frame(s). In some cases, the UT metadata can be structured metadata that is represented, for example, using XML. Example data fields that can be included in UI metadata are shown in Table 1 below.

TABLE 1

EXAMPLE DATA FIELDS

| Data Field | Type |
|---|---|
| Active window title | String |
| Keystroke Name | String |
| Keystroke values | Object |
| Key stroke events | Object |
| Keystroke Delays | nvarchar |
| Mouse coordinates | Object |

TABLE 1-continued

EXAMPLE DATA FIELDS

| Data Field | Type |
|---|---|
| Mouse Events | Object |
| File Version | String |
| Applications involved in the automation | String Array |

At block 312, the particular RPA video-encoding engine 130 sequentially encodes, in a video file, the video frame(s) from the block 304 together with information sufficient to later derive the UI metadata from the block 310. For example, the particular RPA video-encoding engine 130 can encode a representation of the UI metadata. The video file can be a standard video file format such as, but not limited to, audio video interleave (AVI), MPEG-1, MPEG-2. MPEG-4, Matroska, WbM, combinations of the foregoing and/or the like. In an example using AVI, the particular RPA video-encoding engine 130 can use resource interchange file format (RIFF) to divide data to be encoded into chunks, with a first chunk or chunks representing the video frame(s) and subsequent chunk or chunks that are tagged as metadata and include the UI metadata. In that way, through one or more iterations through the block 312, the video file is sequentially encoded.

In some embodiments, the particular RPA video-encoding engine 130 can encrypt when encoding. For example, the encoding at the block 312 can include the particular RPA video-encoding engine 130 encrypting the UI metadata in the video file so as to hide the UI metadata and render it inaccessible to viewers of the video file. In some embodiments, the entirety of the video file can be encrypted.

At decision block 314, the particular RPA video-encoding engine 130 determines whether to continue recording. In various embodiments, the particular RPA video-encoding engine 130 can continue until a command is received to stop recording, in similar fashion to the receiving the command to record at the block 302. The particular RPA video-encoding engine 130 can also stop recording after a predetermined time or whenever other configurable criteria is satisfied, such as the completion of the user-executed process.

If it is determined at the decision block 314 to continue recording, the process 300 returns to the block 304 and executes as described previously. Although blocks 304-314 are described sequentially, it should be appreciated that the described functionality can be performed continuously, at various intervals, and/or in a different sequence. Some functionality can also be partially omitted. For example, in some cases, video frames may be received without any additional UI events having been detected.

If it is determined at the decision block 314 to not continue recording, at block 316, the particular RPA video-encoding engine 130 adds supplemental content to the video file. The supplemental content can include, for example, callouts and process notes that, in various embodiments, can be overlaid on the encoded video frames. The supplemental content can be received, for example, via a video editor used or operated by the particular user system 160. In some embodiments, the block 316 can be omitted, for example, in implementations where it is it not necessary or desirable to add supplemental content.

At block 318, the particular RPA video-encoding engine 130 finalizes the video file. In various embodiments, the block 318 can include taking action to complete the video file and make the video file usable and viewable, for example, in a suitable media player. In some embodiments, the UI metadata generation at the block 310 and/or the encoding at the block 312 can occur all at once as part of the block 318 rather than iteratively as illustrated. In these embodiments, the information generated at the blocks 304-308, for example, can be stored or cached in another format or in one or more intermediate formats, with final encoding into the video file, which is the augmented shareable video file, in conjunction with the block 318.

At block 320, the particular RPA video-encoding engine 130 publishes the video file. In various embodiments, the particular RPA video-encoding engine 130 can output or transmit the video file to the particular user system 160, make the video file available for download or sharing, post the video file on a video-sharing website, combinations of the foregoing and/or the like. Advantageously, in certain embodiments, the video file, as an augmented shareable video file, can serve multiple technical purposes. The video file can be shareable or distributable to depict the user-executed process. In addition, or alternatively, the video file is useable for bot creation as will be described in relation to FIG. 4.

Figure 4:
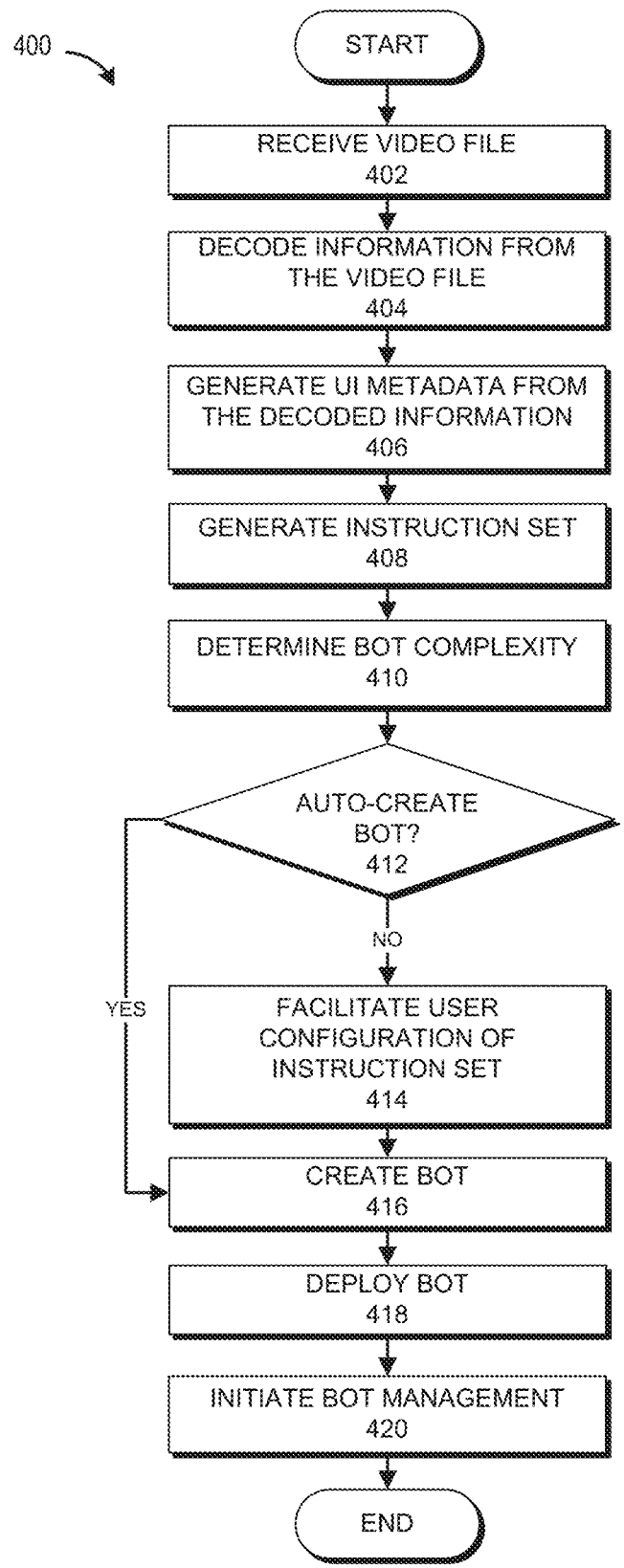
FIG. 4 illustrates an example of a process for creating and deploying a bot using an augmented shareable video file.

FIG. 4 illustrates an example of a process 400 for creating and deploying a bot using an augmented shareable video file. In certain embodiments, the process 400 can be implemented by any system that can process data. Although any number of systems, in whole or in part, can implement the process 400, to simplify discussion, the process 400 will be described in relation to the bot control system 140 of FIG. 1 and particular components thereof, namely, the RPA video-decoding engine 142, the bot creation module 143, the bot deployment module 144, the bot manager 145, and/or the reporting module 146.

At block 402, the bot manager 145 receives a video file that has been created, for example, in the fashion described relative to the process 300 of FIG. 3. At block 404, the bot manager 145 causes the RPA video-decoding engine 142 to decode information from the video file. The decoding at the block 404 can include, for example, decoding video frames and/or information related to UI metadata. The information related to UT metadata can include, for example, information sufficient to derive UI metadata, such as a frame-by-frame representation of the UI metadata. The block 404 can also include decrypting any information that has been encrypted such as, for example, the video frames, the information sufficient derive the UI metadata or the video file as a whole.

At block 406, the RPA video-decoding engine 142 generates UI metadata using the decoded information related to UI metadata. In some embodiments, the block 406 can include generating structured UI metadata using, for example, XML, from the decoded information, translating as necessary.

At block 408, the bot manager 145 causes the bot creation module 143 to generate an instruction set for a new bot. In some embodiments, the instruction set can correspond, at least in part, to a sequence of UI events represented in the generated UI metadata from the block 406, where some or all such UI events can be a step of the instruction set. In some cases, if, for example, the instruction set is already represented in the generated UI metadata from the block 406, the block 408 can be omitted.

At block 410, the bot manager 145 determines a complexity of the new bot. In various embodiments, the complexity can be determined automatically, via user input, or via a combination of user input and automatic functionality.

In various embodiments, the complexity can be a metric and/or a category representative of the complexity of the instruction set. In an illustrative example, complexity can be based on various factors such as, for example, a number of applications involved in the instruction set, a complexity of a computing environment in which a robotic process would be performed, and a complexity of business rules in the instruction set. In some embodiments, each factor can be assigned a scaled metric (e.g., on a scale of 1 to 10), with the complexity of the new bot being computed as an average of the scaled metrics.

Figure 5:
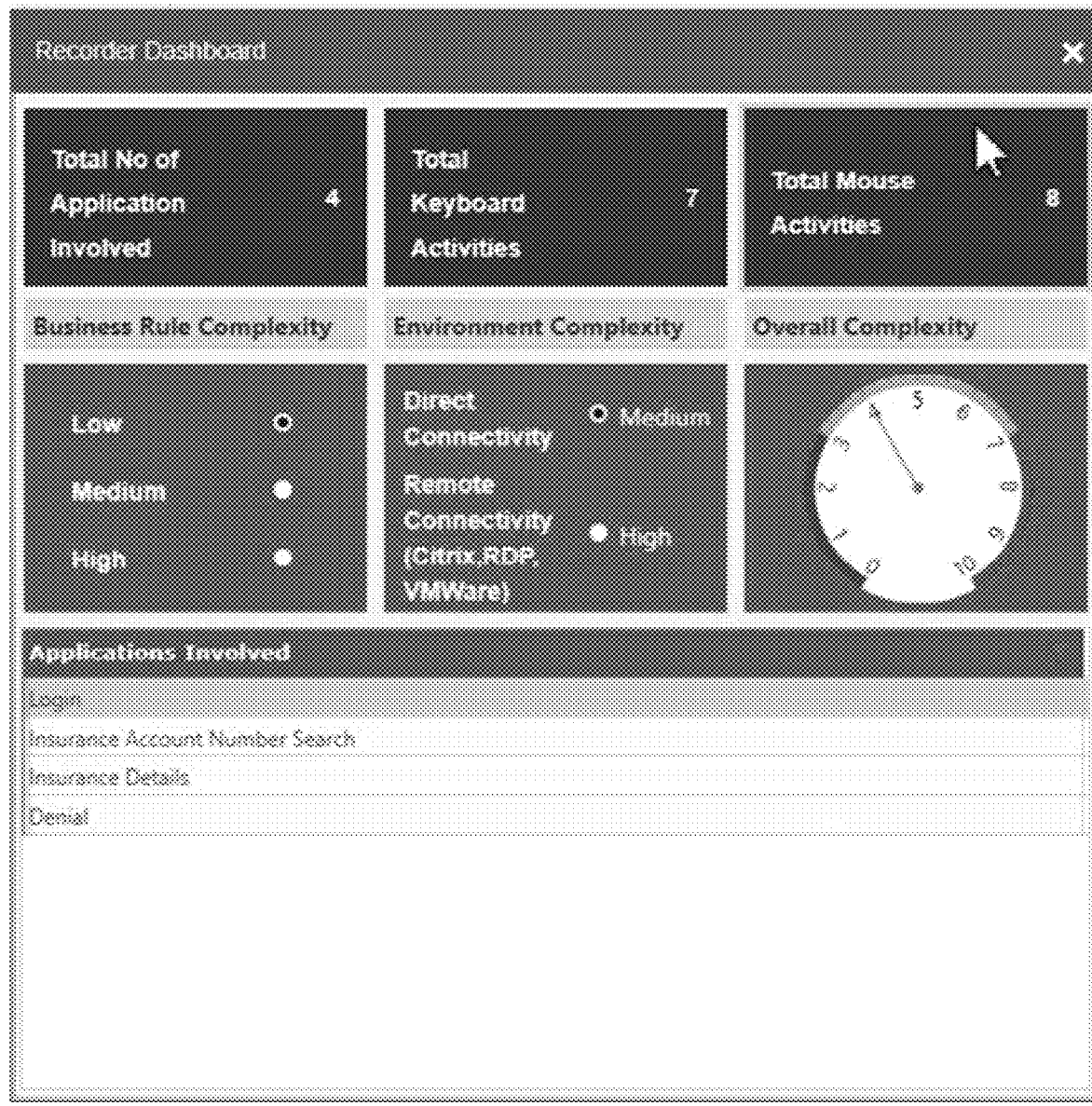
FIG. 5 illustrates an example of a user dashboard that can be presented to a user computer system as part of a complexity determination.

Still with reference to the block 410. FIG. 5 illustrates an example of a user dashboard that can be presented to a user of one of the user systems 160 as part of the complexity determination. The user dashboard of FIG. 5 can be presented, for example, via the bot manager 145 and/or the reporting module 146 of FIG. 1. In the example shown in FIG. 5, selected UI metadata is presented to the user. In addition, the user can input a category for each of business rule complexity and environment complexity, which categories are used to compute the complexity of the new bot. Business rules may be deemed more or less complicated based on, for example, a number of rules, number and type of clauses or programming constructs, combinations of the foregoing, and/or the like. Environment complexity can vary based on, for example, whether connectivity is direct or remote.

In an example, with respect to the business rule complexity, each category can be associated with a scaled metric on a scale of 1 to 10 (e.g., 3, 7, and 10 for low, medium, and high, respectively). Similarly, with respect to environment complexity, each of the two categories shown in FIG. 5 can be associated with a scaled metric on a scale of 1 to 10 (e.g., 5 and 10 for medium and high, respectively). In the example shown in FIG. 5, a business rule complexity could be determined to be low (e.g., corresponding to a value of 3), an environment complexity could be determined to be medium (e.g., corresponding to a value of 5), and a total number of involved applications could be determined from the UI metadata to be 4. According to this example involving three factors, the complexity for the new bot, or overall complexity, could be an average of the three values (i.e., 4). In some embodiments, the complexity of the new bot can be translated into a complexity category such as low complexity, medium complexity, or high complexity (e.g., where 0-3 and 8-10, inclusive, correspond to low and high, respectively, and values between 3 and 8 correspond to medium). In this example, the complexity category for the new bot could be "medium."

Returning to FIG. 4, at decision block 412, the bot creation module 143 determines whether to proceed with automatic bot creation. In some embodiments, the determination at the decision block 412 can be based, at least in part, on the determined complexity from the block 410. In these embodiments, the determination can involve the bot creation module 143 ascertaining whether the determined complexity satisfies configurable criteria for automatic bot creation. For example, the configurable criteria can implement a rule that the bot creation module 143 can only proceed with automatic bot creation for complexities of certain categories (e.g., low or medium) or that have sufficiently low complexity metrics or numbers (e.g., 7 or lower).

If it is determined at the decision block 412 to proceed with automatic bot creation, the process 400 proceeds to block 416. Otherwise, if a negative determination is reached at the decision block 412, the process proceeds to block 414. Further, in some embodiments, automatic bot creation can be allowed to proceeded in every instance. In these embodiments, blocks 410-412 can be omitted and the process can proceed directly from block 408 to 416.

Figure 6:
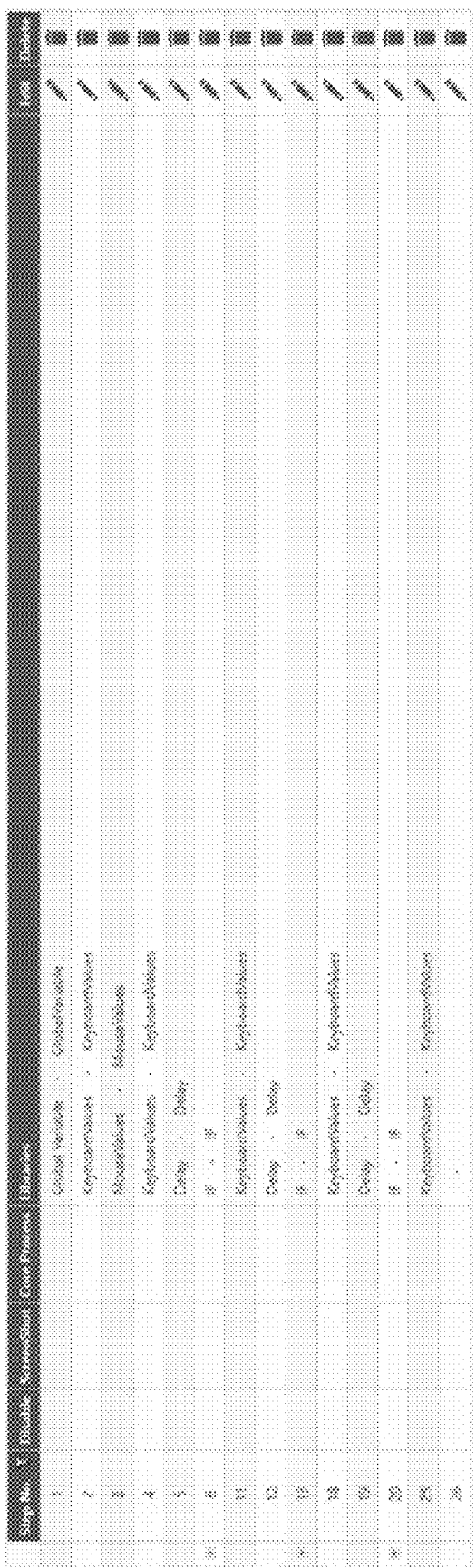
FIG. 6 illustrates an example of a user interface that can be presented to a user system as part of facilitating user configuration.

At block 414, the bot creation module 143 can facilitate user configuration of the instruction set. FIG. 6 illustrates an example of a UI that can be presented to the user as part of the facilitation of user configuration. As shown in FIG. 6, the bot creation module 143 can present a series of steps of an instruction set to the user and allow the user, for example, to edit or delete steps. From block 414, the process 400 proceeds to block 416.

At block 416, the bot creation module 143 proceeds with bot creation using the instruction set as potentially edited at the block 414. For example, the bot creation module 143 can adapt or translate the instruction set, as necessary, for a particular RPA platform of the RPA platforms 124 of FIG. 1. In some embodiments, there may not be any further action required of the bot creation module 143 beyond the instruction set which was generated at the block 408 and potentially edited at the block 414. In these embodiments, the block 416 may be omitted.

At block 418, the bot manager 145 causes the bot deployment module 144 to deploy the bot on a selected RPA platform, for example, of the RPA platforms 124 of FIG. 1. As part of the block 418, the bot deployment module 144 can cause the selected RPA platform to execute the bot, thereby executing a user-executed process as a robotic process. Following deployment, the bot can be considered one of the managed bots 120. At block 420, the bot manager 145 initiates bot management, for example, by monitoring the bot as one of the managed bots 120 and/or by publishing a configuration interface that enables management of the bot. After block 420, the process 400 ends.

FIGS. 7-8, 9A-B, 10-11, 12A-B, 13-18, 19A-B, and 20-23 illustrate examples of structured UI metadata represented in XML. In particular. FIGS. 7, 8, 9A-B, 10, 11, 12A-B, 13, 14, 15, 16, 17, 18, 19A-B, 20, 21, and 22 each illustrate a step of an instruction set, for example, as a set of one or more UI events and/or one or more business rules. FIG. 23 illustrates an example of additional UI metadata that can supplement the sequence of steps and facilitate bot creation. In some embodiments, the contents of FIGS. 7-8, 9A-B, 10-11, 12A-B, 13-18, 19A-B, and 20-23 can represent an example of a single XML file. It should be appreciated that FIGS. 7-8, 9A-B, 10-11, 12A-B, 13-18, 19A-B, and 20-23 are provided solely as illustrative examples. After a detailed review of the present disclosure, one skilled in the art will recognize that numerous other arrangements and formats of UI metadata are possible and contemplated without deviating from the inventive principles described herein.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments, are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method of robotic process automation, the method comprising, by a computer system:
   receiving a command to record user interface (UI) activity in a computing environment;
   responsive to the command:
      receiving video frames of a live screen output of the computing environment;
      detecting UI events in the computing environment in relation to the video frames of the live screen output; and
      determining target applications for the UI events, wherein the target applications are executing in the computing environment;
   generating UI metadata comprising information identifying the UI events and the target applications in relation to the video frames; and
   sequentially encoding, in a video file, the video frames together with information sufficient to derive the UI metadata.

2. The method of claim 1, wherein the generating comprises generating structured UI metadata in a markup language.

3. The method of claim 1, comprising publishing the video file to a user.

4. The method of claim 3, comprising overlaying supplemental content on the encoded video frames of the video file prior to the publishing.

5. The method of claim 1, wherein the sequentially encoding comprises encrypting, in the video file, the information sufficient to derive the UI metadata.

6. The method of claim 1, wherein the information sufficient to derive the UI metadata comprises a representation of the UI metadata.

7. The method of claim 1, wherein:
   the encoded video frames of the video file depicts a user-executed process in the computing environment; and
   the encoded information sufficient to derive the UI metadata comprises an instruction set for a bot.

8. The method of claim 1, wherein the UI events correspond to input from an input device selected form the group consisting of keyboard, mouse, and touchscreen.

9. The method of claim 1, comprising:
   receiving the video file;
   decoding, from the video file, the information sufficient to derive the UI metadata;
   generating the UI metadata from the decoded information; and
   creating a bot using the UI metadata.

10. The method of claim 9 comprising, prior to the creating, determining a complexity of an instruction set for the bot.

11. The method of claim 10, wherein the creating the bot is performed automatically without user configuration in response to the determined complexity satisfying criteria for automatic bot creation.

12. The method of claim 10, comprising facilitating user configuration of the instruction set in response to the determined complexity not satisfying criteria for automatic bot creation.

13. The method of claim 9 comprising, responsive to the automatically creating, automatically deploying the bot on a robotic process automation platform.

14. The method of claim 11, wherein the deployed bot executes a user-executed process depicted in the video file as a robotic process.

15. A computer system comprising a processor and memory, wherein the processor and the memory in combination are operable to implement a method comprising:
   receiving a command to record user interface (UI) activity in a computing environment;
   responsive to the command:
      receiving video frames of a live screen output of the computing environment;
      detecting UI events in the computing environment in relation to the video frames of the live screen output; and
      determining target applications for the UI events, wherein the target applications are executing in the computing environment;
   generating UI metadata comprising information identifying the UI events and the target applications in relation to the video frames; and
   sequentially encoding, in a video file, the video frames together with information sufficient to derive the UI metadata.

16. The computer system of claim 15, wherein the generating comprises generating structured UI metadata in a markup language.

17. The computer system of claim 15, wherein the sequentially encoding comprises encrypting, in the video file, the information sufficient to derive the UI metadata.

18. The computer system of claim 15, the method comprising:
   receiving the video file;
   decoding, from the video file, the information sufficient to derive the UI metadata;
   generating the UI metadata from the decoded information; and
   creating a bot using the UI metadata.

19. The computer system of claim 15, the method comprising:
- prior to the creating, determining a complexity of an instruction set for the bot; and
- wherein the creating the bot is performed automatically without user configuration in response to the determined complexity satisfying criteria for automatic bot creation.

20. A computer-program product comprising a non-transitory computer-usable medium having computer-readable program code embodied therein, the computer-readable program code adapted to be executed to implement a method comprising:
- receiving a command to record user interface (UI) activity in a computing environment;
- responsive to the command:
  - receiving video frames of a live screen output of the computing environment;
  - detecting UI events in the computing environment in relation to the video frames of the live screen output; and
  - determining target applications for the UI events, wherein the target applications are executing in the computing environment;
- generating UI metadata comprising information identifying the UI events and the target applications in relation to the video frames; and
- sequentially encoding, in a video file, the video frames together with information sufficient to derive the UI metadata.

* * * * *